United States Patent
Ohsawa (10) Patent No.: US 9,229,509 B2
(45) Date of Patent: Jan. 5, 2016

(54) CONTROL DEVICE

(71) Applicant: KABUSHIKI KAISHA YASKAWA DENKI, Kitakyushu-shi (JP)

(72) Inventor: Kazumasa Ohsawa, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 246 days.

(21) Appl. No.: 14/016,230

(22) Filed: Sep. 3, 2013

(65) Prior Publication Data

US 2014/0006814 A1   Jan. 2, 2014

Related U.S. Application Data

(63) Continuation-in-part of application No. PCT/JP2012/053944, filed on Feb. 20, 2012.

(30) Foreign Application Priority Data

Mar. 4, 2011  (JP) ................. 2011-048095

(51) Int. Cl.
   *G06F 1/26* (2006.01)
   *G05B 19/042* (2006.01)
   *G05B 19/05* (2006.01)

(52) U.S. Cl.
   CPC .............. *G06F 1/26* (2013.01); *G05B 19/0428* (2013.01); *G05B 19/058* (2013.01); *G05B 2219/1198* (2013.01); *G05B 2219/15096* (2013.01); *G05B 2219/21151* (2013.01)

(58) Field of Classification Search
   CPC ....................................................... G06F 1/26
   See application file for complete search history.

(56) References Cited

U.S. PATENT DOCUMENTS

2006/0230299 A1*  10/2006  Zaretsky et al. ............. 713/320
2008/0313476 A1*  12/2008  Hansen ......................... 713/300
2010/0106987 A1*   4/2010  Lambert et al. .............. 713/320

FOREIGN PATENT DOCUMENTS

| JP | 01-184503 | 7/1989 |
| JP | 08-087307 | 4/1996 |
| JP | 2002-108417 | 4/2002 |
| JP | 2010-092391 | 4/2010 |

OTHER PUBLICATIONS

Taiwanese Office Action for corresponding TW Application No. 101106970, Nov. 11, 2014.
Chinese Office Action for corresponding CN Application No. 201280011343.7, Feb. 4, 2015.
Extended European Search Report for corresponding EP Application No. 12754789.1-1802, Jul. 16, 2014.
International Search Report for corresponding International Application No. PCT/JP2012/053944, Apr. 10, 2012.
Written Opinion for corresponding International Application No. PCT/JP2012/053944, Apr. 10, 2012.

* cited by examiner

*Primary Examiner* — Albert Wang
(74) *Attorney, Agent, or Firm* — Mori & Ward, LLP (57) ABSTRACT

A programmable controller is of a building block type provided with a plurality of modules including a power supply module and a CPU module. The CPU module includes a microprocessor having a determination control function for determining the adaptability of a power supply capacity of the power supply module by comparing the power supply capacity of the power supply module with a sum total value of current consumptions of the respective modules other than the power supply module. The power supply module supplies a first power used for the determination of the adaptability of the power supply capacity of the power supply module including power supplied to the microprocessor and a second power used for others as at least two independent power supply systems.

14 Claims, 10 Drawing Sheets

ID
CONTROL DEVICE

CROSS-REFERENCE TO RELATED APPLICATION(S)

The present application is a continuation application of PCT/JP2012/053944, filed Feb. 20, 2012, which claims priority to Japanese Patent Application No. 2011-048095, filed Mar. 4, 2011. The contents of these applications are incorporated herein by reference in their entirety.

TECHNICAL FIELD

The disclosed embodiment relates to a control device of a building block type provided with a plurality of modules.

BACKGROUND OF THE INVENTION

Conventionally, control devices of a building block type which are configured by connecting a plurality of modules are known (for example, refer to JP01-184503A). This control device (programmable controller) of the conventional technology calculates a current consumption of the entire module to be connected, compares it with a power supply capacity of a power supply module, and determines the adaptability of the power supply module.

SUMMARY OF THE INVENTION

According to one aspect of the present disclosure, a control device of a building block type is provided. The control device is provided with a plurality of modules at least including a power supply module and a CPU module. The CPU module has a processor provided with a determination control function for determining, by comparing a power supply capacity of the power supply module with a sum total value of current consumption of respective modules other than the power supply module, adaptability of the power supply capacity of the power supply module. The power supply module provides a first power used for the determination of the adaptability of the power supply capacity including a power supplied to the processor and a second power supply used for others, as at least two independent power supply systems.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

Hereinafter, one embodiment is described referring to the accompanying drawings.

Figure 1:
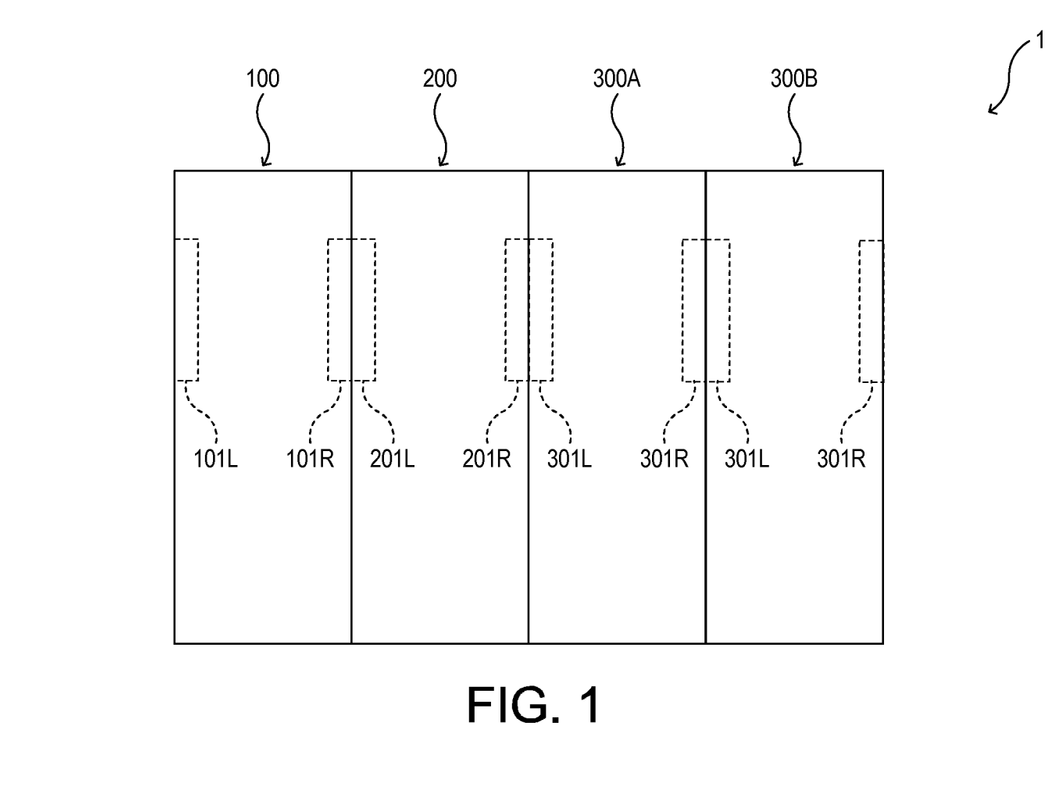
FIG. 1 is a configuration view conceptionally representing one example of the entire configuration of a programmable controller of one embodiment.

As shown in FIG. 1, a programmable controller 1 (control device) of this embodiment is of a building block type provided with a plurality of modules including a power supply module 100 and a CPU module 200, and is constructed so that a plurality of functional modules 300A and 300B can be additionally provided in a predetermined direction (the left-to-right direction in FIG. 1). The building block type is a type in which modules are formed in a box shape (block) and the module(s) are additionally provided block by block. Further, the functional modules 300A and 300B, which can be additionally provided, include, for example, a discrete I/O module, an analog I/O module, a pulse I/O module, a communication module, a motion module that performs a drive control of a motor, and, among others, high-function functional modules, such as the communication module and the motion module, equip processors such as microprocessors.

In this example, the programmable controller 1 includes the power supply module 100, the CPU module 200, and the two functional modules 300A and 300B in this order from the left side to the right side in FIG. 1. Connectors 101L and 101R are provided in both side faces of the power supply module 100, connectors 201L and 201R are provided in both side faces of the CPU module 200, and connectors 301L and 301R are provided in both side faces of each of the functional modules 300A and 300B, respectively. Then, the connectors of adjacent modules are fit to each other, that is, by fitting the connector 101R of the power supply module 100 and the connector 201L of the CPU module 200, fitting the connector 201R of the CPU module 200 and the connector 301L of the functional module 300A, and fitting the connector 301R of the functional module 300A and the connector 301L of the functional module 300B, the power supply module 100, the CPU module 200, and the functional modules 300A and 300B are connected, respectively.

Below, a case where the programmable controller 1 includes the power supply module 100, the CPU module 200, and the functional modules 300A and 300B in this order from the left side to the right side is described as one example.

Figure 2:
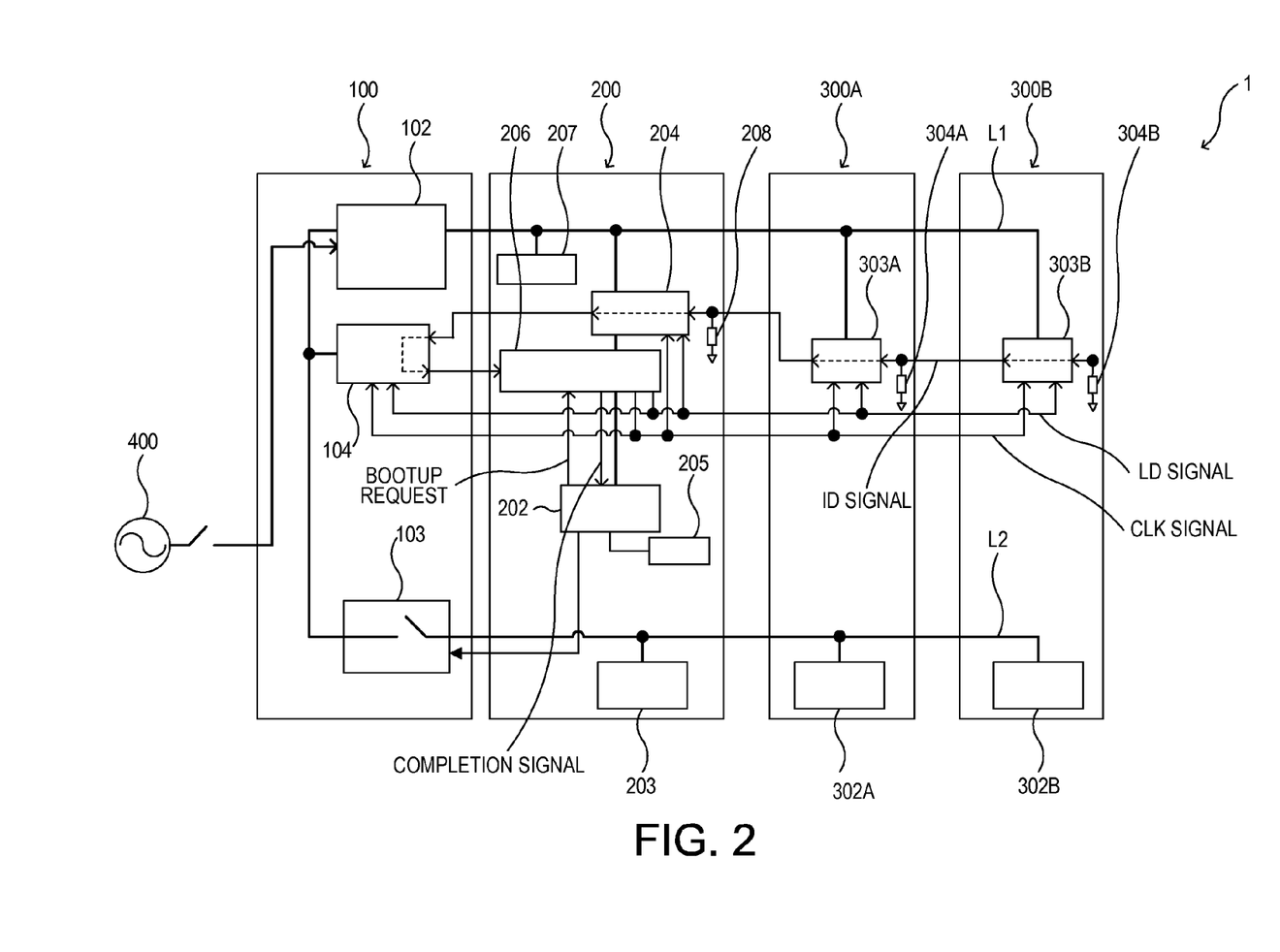
FIG. 2 is an illustrative view conceptionally representing configurations of respective modules which the programmable controller equips, signal routes between the respective modules, and energizing routes between the respective modules.

As shown in FIG. 2, the power supply module 100 includes a converter 102 (first power supply device) connected with a primary side power supply 400 of AC (Alternating Current) or DC (Direct Current), a relay 103, and a unit ID part 104

(identification information outputting unit) which outputs an ID signal corresponding to a unit ID which is its own identification information.

The converter 102 generates a power supply voltage (VCC) based on a commercial power supplied from the primary side power supply 400, and supplies the generated power supply voltage as a first power via a first power supply system line L1, while it supplies the generated power supply voltage as a second power via the relay 103 and a second power supply system line L2. In other words, this corresponds to generating the first power and the second power, and supplying the generated first power and second power as two independent power supply systems. The first power is a power used for a determination of the adaptability of a power supply capacity of the power supply module 100 described below, including a power supplied to a microprocessor 202 of the CPU module 200 described below, and the second power is a power used for others (for example, data exchanges of the CPU module 200 and the respective functional modules 300A and 300B, and operations of the microprocessors of the respective functional modules 300A and 300B). Note that, in this example, although the second power is supplied via the single second power supply system line L2 (supplied as a single power supply system), it is not limited to this, and it may be supplied via a plurality of power supply system lines (supplied as a plurality of power supply systems).

The relay 103 switches between isolation and supply of the second power from the converter 102 by opening and closing a contact. That is, by opening the contact, the second power from the converter 102 is cut off, and by closing the contact, the second power from the converter 102 is supplied via the second power system line L2.

The functional module 300A includes a microprocessor (not illustrated), an I/O unit, and a communication unit, and, in addition to the microprocessor, the I/O unit, and the communication unit, it includes a module control unit 302A provided with a bus function for performing a data exchange with the CPU module 200 and the functional module 300B, a unit ID part 303A (identification information outputting unit) which outputs the ID signal corresponding to its own unit ID, and a pull-down resistor 304A.

The functional module 300B includes a microprocessor (not illustrated), an I/O unit, and a communication unit, and, in addition to the microprocessor, the I/O unit, and the communication unit, it includes a module control unit 302B provided with a bus function for performing a data exchange with the CPU module 200 and the functional module 300A, a unit ID part 303B (identification information outputting unit) which outputs an ID signal corresponding to its own unit ID, and a pull-down resistor 304B.

The CPU module 200 includes the microprocessor 202 (processor) which performs various controls of the entire module, a bus controlling unit 203 provided with a bus function for exchanging data with the respective functional modules 300A and 300B, a unit ID part 204 (identification information outputting unit) which outputs an ID signal corresponding to its own unit ID, a data table memory unit 205 (first memory unit), an ID readout circuit block 206 (identification information readout unit), a status display unit 207 (display unit) which performs various indications, and a pull-down resistor 208.

The microprocessor 202 has a determination control function for determining the adaptability of the power supply capacity of the power supply module 100 by comparing the power supply capacity of the power supply module 100 which is a capacity of the power supply outputted from the converter 102 of the power supply module 100 with the sum total value of the current consumptions of the respective modules other than the power supply module 100 (i.e., the CPU module 200, and the functional modules 300A and 300B). Further, when the microprocessor 202 determines that the power supply capacity of the power supply module 100 is adaptable, it then determines whether the power supply module 100 is replaceable to a power supply module having a smaller capacity on a corresponding product lineup. Note that the details of the determination executed by the microprocessor 202 will be described later.

The data table memory unit 205 is comprised of a nonvolatile memory. This data table memory unit 205 stores a data table comprised of the unit IDs of the plurality of modules, and module information corresponding to the unit IDs (power-supply capacity information of the power supply module, current consumption information of the CPU module or the functional module, etc.). Note that the data table may be stored in a nonvolatile memory provided inside the microprocessor 202. That is, the first memory unit may also be a nonvolatile memory provided inside the microprocessor 202.

Figure 3A:
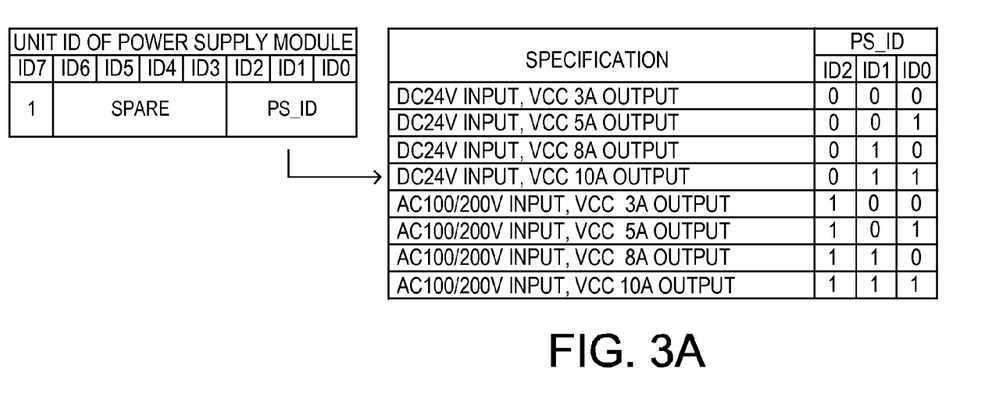
FIGS. 3A and 3B are illustrative views representing examples of the configuration of the unit ID parts, and examples of data tables.

FIG. 3A shows one example of the configuration of the unit ID of the power supply module 100 and one example of the data table comprised of the unit IDs of the plurality of power supply modules and the module information corresponding to the unit IDs.

As shown in FIG. 3A, the unit ID of the power supply module 100 is comprised of 8 bits (1 byte), i.e., ID0 to ID7. In this example, the module information containing the power-supply capacity information of the power supply module 100 is expressed by ID0 to ID2 which is "PS_ID" among ID0 to ID7, where ID0 to ID2 are expressed as "PS_ID," ID3 to ID6 as "Spare," and ID7 as "1." Note that ID3 to ID6 which are "Spare" represent a range which is not used for expressing the module information at present, but will be used for expressing the module information along with ID0 to ID2 in the future.

In the data table shown in the right side of FIG. 3A, only ID0 to ID2 which are "PS_ID" among the 8-bit unit IDs of ID0 to ID7 are shown (illustration of ID3 to ID7 is omitted). For example, this data table stores "DC24V input and VCC3A output" in the "specification" column, as the module information of the power supply module to which the unit IDs where ID2, ID1, and ID0 which are "PS_ID" become "0," "0," and "0" are assigned.

Figure 3B:
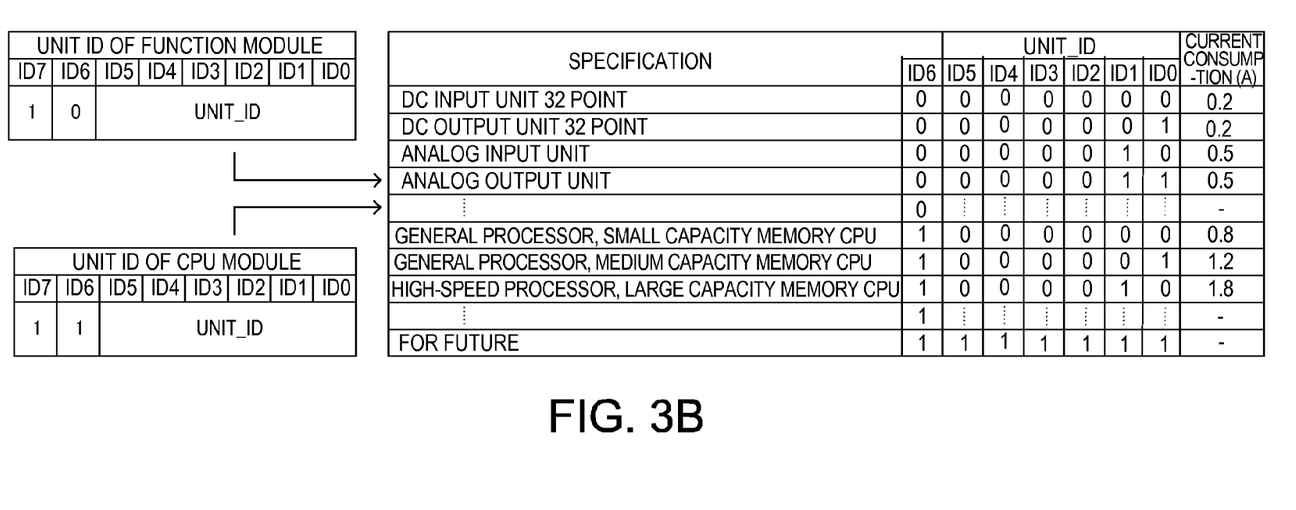

FIG. 3B shows one example of the configuration of the unit IDs of the CPU module 200 and the functional modules 300A and 300B, and one example of the data table comprised of the unit IDs of the plurality of CPU modules and functional modules, and the module information corresponding to the unit IDs.

As shown in FIG. 3B, the unit ID of the CPU module 200 is comprised of ID0 to ID7, similar to the unit ID of the power supply module 100 described above. In this example, the module information containing the current consumption information of the CPU module 200 is expressed by ID0 to ID5 which are "UNIT_ID" and ID6 which is "0" where, among ID0 to ID7, ID0 to ID5 are expressed as "UNIT_ID," ID6 as "0," and ID7 as "1." Further, each unit ID of the functional modules 300A and 300B is comprised of ID0 to ID7, similar to the unit IDs of the power supply module 100 and the CPU module 200 described above. In this example, the module information containing the current consumption information of the functional module 300 is expressed by ID0 to ID5 which are "UNIT_ID" and ID6 which is "1" where, among ID0 to ID7, ID0 to ID5 are expressed as "UNIT_ID," ID6 as "1," and ID7 as "1."

In the data table shown in the right side of FIG. 3B, only ID0 to ID5 which are "UNIT_ID" and ID6 are shown among the 8-bit unit IDs of ID0 to ID7 (illustration of ID7 is omitted). For example, this data table stores "DC input unit 32 point" in the "specification" column and "0.2" in the "current consumption (A)" column as the module information of the module (i.e., the functional module) to which the unit IDs where ID6 and ID5, ID4, ID3, ID2, ID1, and ID0 which are "UNIT_ID" become "0," "0," "0," "0," "0," "0," and "0" are assigned.

Figure 4:
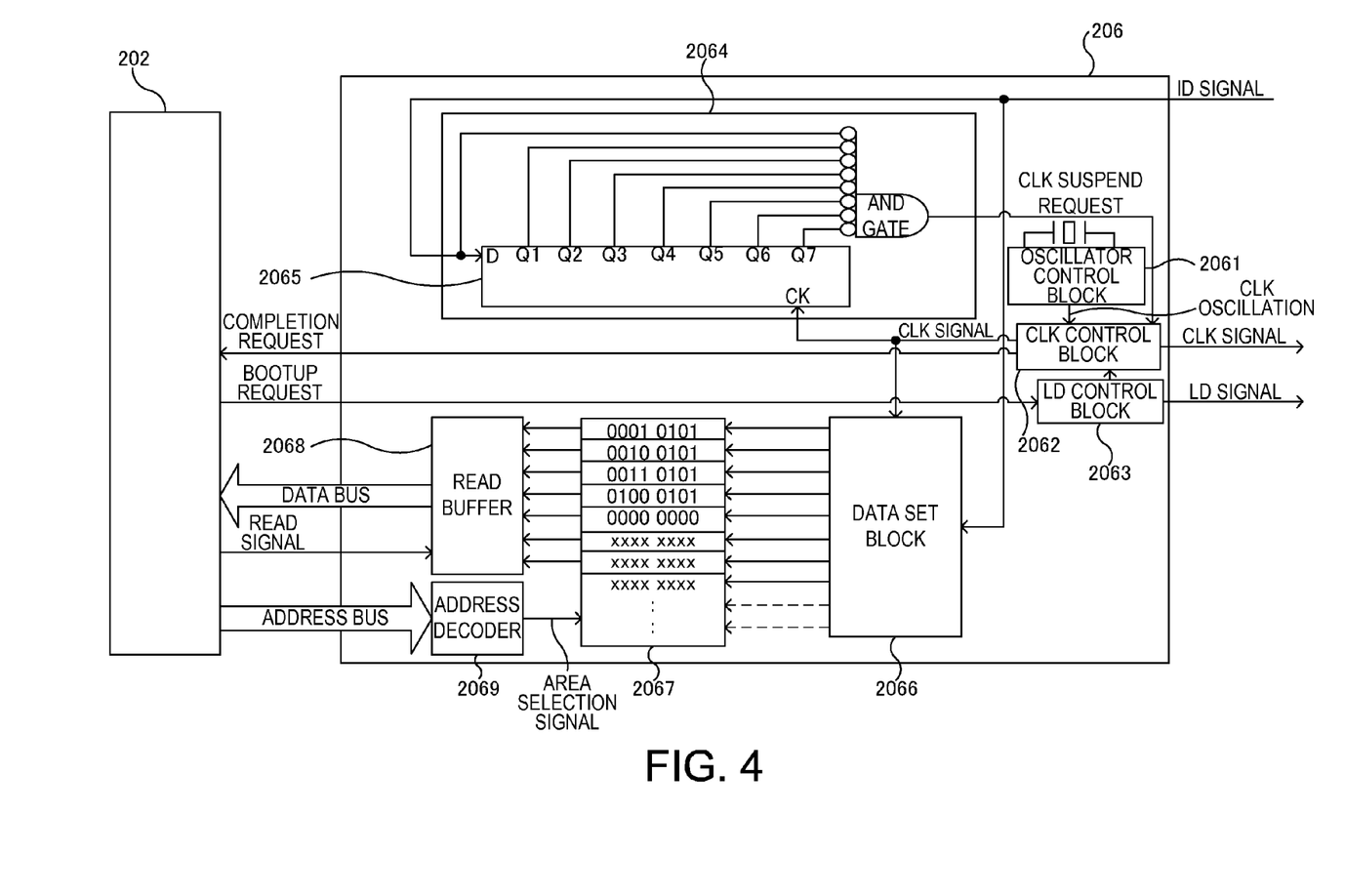
FIG. 4 is a block diagram conceptionally representing the details of an ID readout circuit block.

Returning to FIG. 2, the ID readout circuit block 206 outputs CLK signal which is an output command of the unit IDs to the unit ID parts 104, 204, 303A, and 303B of the power supply module 100, the CPU module 200, and the functional modules 300A and 300B, respectively. Along with this, the ID signals described above outputted from the respective unit ID parts 104, 204, 303A, and 303B according to the CLK signal are inputted, and corresponding unit IDs are stored. As shown in FIG. 4, this ID readout circuit block 206 includes an oscillator circuit block 2061, a CLK control block 2062, an LD control block 2063, a terminal code detection block 2064, a dataset block 2066, a unit ID register 2067, a read buffer 2068, and an address decoder 2069.

The oscillator circuit block 2061 generates a CLK oscillation. The CLK control block 2062 outputs the CLK signal described above to the respective unit ID parts 104, 204, 303A, and 303B based on the CLK oscillation generated from the oscillator circuit block 2061. Note that, although the oscillation clock is connected with the CLK control block 2062 in this example, the clock may also be commonly used as a clock source which supplies to the microprocessor 202. The LD control block 2063 outputs an LD signal for causing the respective unit ID parts 104, 204, 303A, and 303B to preset the unit IDs. The terminal code detection block 2064 is provided with a shift register 2065, and regularly monitors eight consecutive ID signals described above which are latched by the shift register 2065 and detects a terminal code. The dataset block 2066 sets the unit ID to the unit ID register 2067 based on the ID signal described above from the respective unit ID parts 104, 204, 303A, and 303B. The unit ID is read from the unit ID register 2067 to the read buffer 2068. The address decoder 2069 outputs an area selection signal to the unit ID register 2067.

Returning to FIG. 2, the status display unit 207 is comprised of, for example, lamps such as LEDs (Light Emitting Diodes), or a liquid crystal display. This status display unit 207 displays a predetermined error and warning according to the result of the determination executed by the microprocessor 202 described above (described later in detail).

In the programmable controller 1 configured as described above, as shown in FIG. 2, when the programmable controller 1 is powered up, commercial power is supplied from the primary side power supply 400 to the converter 102 of the power supply module 100, and only the first power is first supplied from the power supply module 100 to other CPU module 200 and functional modules 300A and 300B. That is, the first power generated by the converter 102 energizes on the first power system line L1, and the first power is supplied via the first power system line L1 to the unit ID part 104 of the power supply module 100, to the status display unit 207, the unit ID part 204, the ID readout circuit block 206, and the microprocessor 202 of the CPU module 200, and to the unit ID parts 303A and 303B of the respective functional modules 300A and 300B. Note that, when the programmable controller 1 is powered up, the contact of the relay 103 is open, second power supply generated by the converter 102 is cut off, and the second power is prevented from being supplied from the power supply module 100 to other CPU module 200 and functional modules 300A and 300B. That is, the second power is not supplied via the second power system line L2 to the bus controlling unit 203 of the CPU module 200, and the module control units 302A and 302B of the respective functional modules 300A and 300B. As described above, the power supply module 100 supplies only the first power via the first power system line L1 to other CPU module 200, and to the functional modules 300A and 300B, when the programmable controller 1 is powered up.

Figure 5:
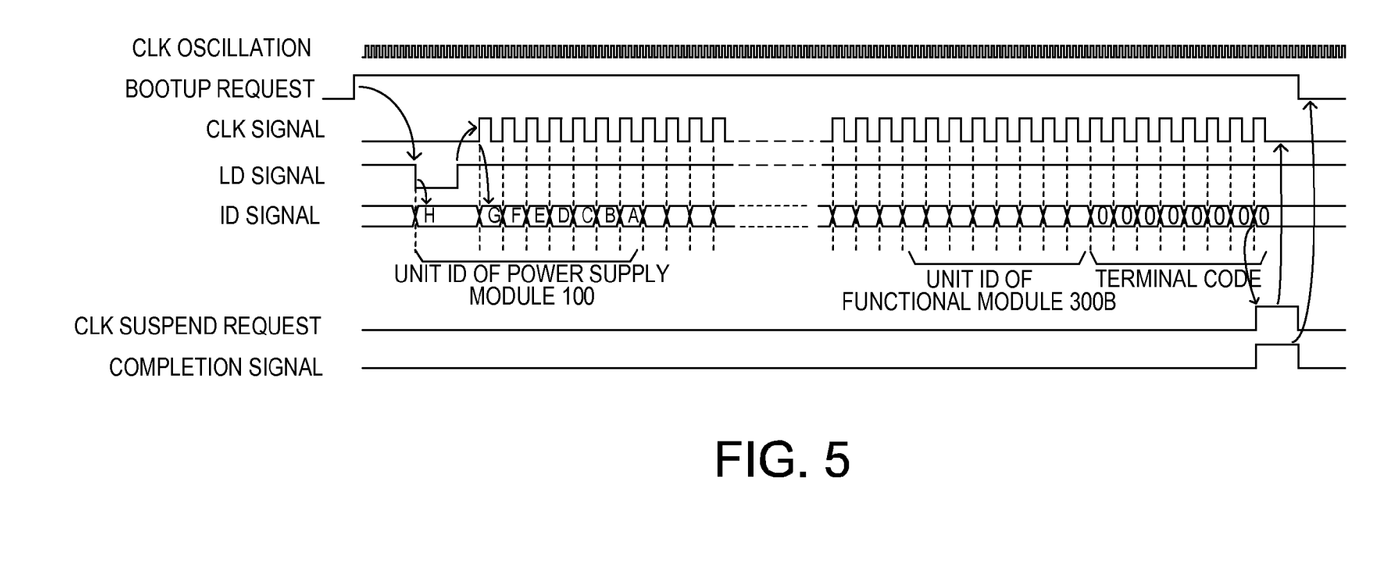
FIG. 5 is a timing chart conceptionally representing output timings of various signals.

Then, as shown in FIGS. 2, 4, and 5, the microprocessor 202 of the CPU module 200 executes predetermined initialization processing when the first power is supplied from the converter 102, and it then outputs a bootup request to the LD control block 2063 of the ID readout circuit block 206. The LD control block 2063 first outputs the LD signals to the unit ID parts 104, 204, 303A, and 303B of the power supply module 100, the CPU module 200, and the functional modules 300A and 300B, when the bootup request is inputted from the microprocessor 202.

Figure 6:
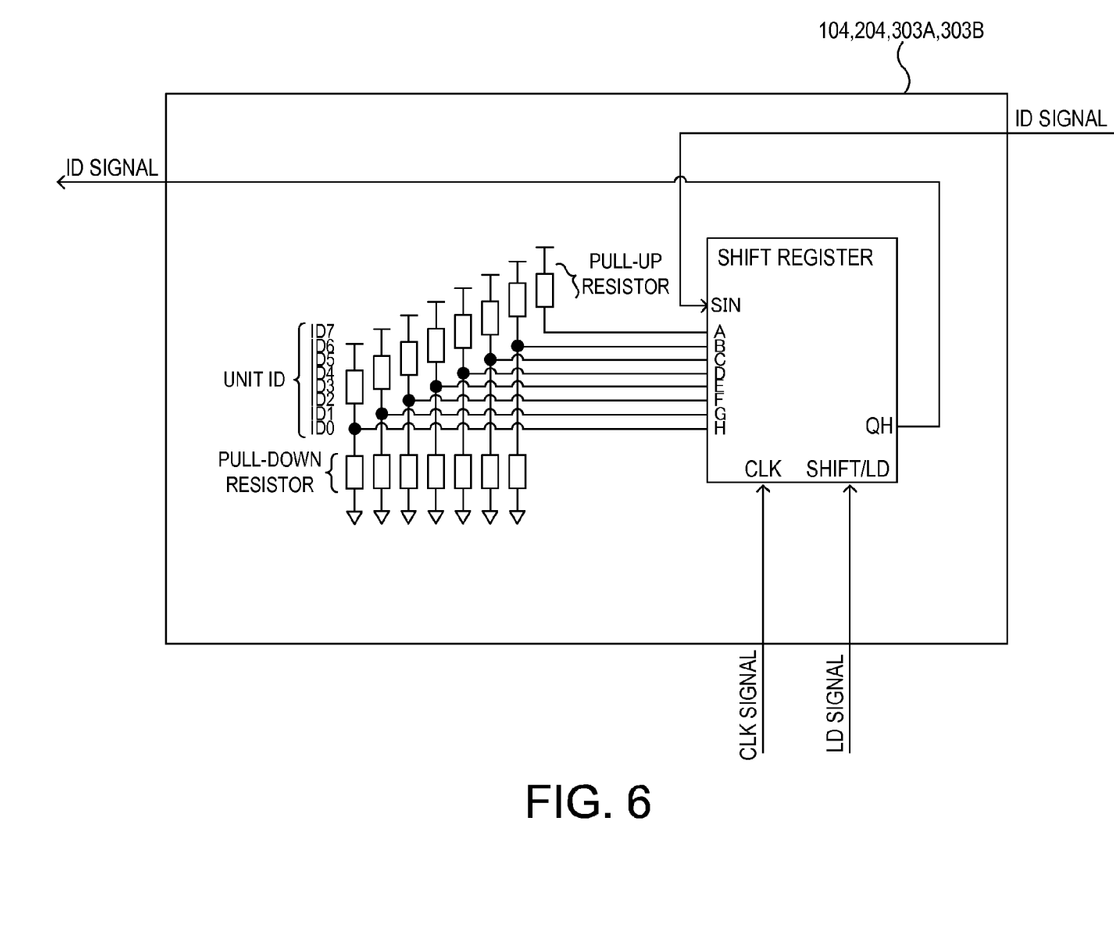
FIG. 6 is a block diagram conceptionally representing the details of a unit ID.

Here, as shown in FIG. 6, each of the unit ID parts 104, 204, 303A, and 303B is respectively comprised of a shift register, a pull-up resistor, a pull-down resistor, and the like where eight flip-flops capable of holding 1-bit data ("0" or "1") are cascade-connected, and the shift registers of the respective unit ID parts 104, 204, 303A, and 303B are connected in series. The unit IDs of the power supply module 100, the CPU module 200, and the functional modules 300A and 300B are each comprised of 8 bits (i.e., ID0 to ID7) as described above. Note that, in this embodiment, "00000000" in which all of ID0 to ID7 become "0" cannot be assigned as the unit ID. ID0 to ID6 are different in "0" and "1," i.e., a pull-up (H level) and a pull-down, (L level) for each module, and ID7 is fixed to "1," i.e., the pull-up (H level). Then, the respective unit ID parts 104, 204, 303A, and 303B input the 8-bit data comprised of ID0 to ID7, 1 bit at a time, from into the eight flip-flops in the shift registers, respectively, via corresponding inputs of H, G, F, E, D, C, B, and A, as the unit IDs, when the LD signals are pulse-inputted from the LD control block 2063.

The LD control block 2063 outputs a CLK start request to the CLK control block 2062, after outputting the LD signal as described above. The CLK control block 2062 sequentially outputs the CLK signal to the respective unit ID parts 104, 204, 303A, and 303B, when the CLK start request is inputted from the LD control block 2063. Then, each time the CLK control block 2062 outputs the CLK signal once, data shifts one stage at a time in the shift registers of the respective unit ID parts 104, 204, 303A, and 303B.

At this time, "0" on which the GND potential connected with the pull-down resistor 304B described above is acted is inputted into the first stage of the flip-flop (the flip-flop corresponding to the input of A) of the shift register in the unit ID part 303B of the functional module 300B with which a module is not equipped on the right side. Further, the data being held in the final stages of the flip-flops (flip-flops corresponding to the inputs of H) of the shift registers in the unit ID parts 204, and 303A and 303B of the CPU module 200, and the functional modules 300A and 300B other than the power supply module 100 are outputted as the ID signals to be inputted into the first stage of the flip-flop (the flip-flop corresponding to the input of A) of the shift register in the unit ID part of the module, which is equipped on the left side of the module. Further, the data being held in the flip-flop of the final stage of the shift register in the unit ID part 104 of the power supply module 100 is outputted as the ID signal to be inputted into the terminal code detection block 2064 and the dataset block 2066.

The terminal code detection block 2064 regularly monitors the inputted ID signal, and, when the ID signals of "0" due to the effects of the GND potential connected with the pull-down resistor 304B of the functional module 300B where the module is not equipped on the right side is inputted eight consecutive times, the terminal code "00000000" is detected, reading-out of the unit IDs from all the modules, i.e., the power supply module 100, the CPU module 200, and the functional modules 300A and 300B are identified. Then, a CLK suspend request is outputted to the CLK control block 2062.

Note that, in this example, although it is configured that "00000000" where all the 8 bits become "0" is prevented from being assigned to the unit IDs, and the CPU module 200 and the functional modules 300A and 300B are provided with the pull-down resistors 208, and 304A and 304B, respectively, it is not limited to this. That is, it may also be configured that "11111111" where all the 8 bits become "1" is prevented from being assigned to the unit IDs, and the CPU module 200 and the functional modules 300A and 300B are provided with a pull-up resistor, respectively. In this case, "1" on which the VCC potential connected with the pull-up resistor is acted is inputted as the ID signal into the first stage of the flip-flop of the shift register in the unit ID part 303B of the functional module 300B, and the terminal code detection block 2064 detects the terminal code "11111111" when the ID signal of "1" is inputted eight consecutive times, and then outputs the CLK suspend request to the CLK control block 2062.

When the CLK suspend request is inputted from the terminal code detection block 2064, the CLK control block 2062 suspends the output of the CLK signal to the respective unit ID parts 104, 204, 303A, and 303B, and outputs a completion signal to the microprocessor 202. On the other hand, the ID signal is also inputted into the dataset block 2066 as described above, and the dataset block 2066 converts the inputted ID signal into 8-bitwise (1-bytewise) parallel data (the unit ID or terminal code "00000000"), and then sets it to the unit ID register 2067.

When the completion signal from the CLK control block 2062 is inputted, the microprocessor 202 outputs the control signal to the address decoder 2069 via the address bus, and causes to output the area selection signal to the unit ID register 2067. Together with this, it outputs a read signal to the read buffer 2068, reads the 8-bitwise parallel data, which is set in the unit ID register 2067, in 1 byte at a time (or, may be unit of one word) sequentially from an upper address, and then sequentially acquires the read data via the data bus. This sequentially acquires the unit IDs for the power supply module 100, the CPU module 200, and all the functional modules 300A and 300B. Note that, finally, by acquiring the terminal code "00000000," it can be aware that the unit ID read immediately before was the final unit ID (the unit ID of the functional module 300B).

Then, the microprocessor 202 accesses the data table stored in the table data storage part 205 described above, and, based on the unit IDs acquired as described above, the corresponding module information, i.e., the module information on all the power supply module 100, the CPU module 200, and the functional modules 300A and 300B are acquired. Then, the microprocessor 202 uses the acquired module information to, for example, determine the adaptability of the power supply capacity of the power supply module 100, and, when it determines that the power supply capacity of the power supply module 100 is adaptable, it outputs the control signal to the relay 103 of the power supply module 100 to close the contact of the relay 103. This supplies the second power generated by the converter 102 from the power supply module 100 to other CPU module 200 and functional modules 300A and 300B. That is, the second power is supplied, via the second power system line L2, to the bus controlling unit 203 of the CPU module 200, and the module control units 302A and 302B of the respective functional modules 300A and 300B.

Then, by energizing the bus controlling unit 203 of the CPU module 200, the bus function of the bus controlling unit 203 is normally operated, and by energizing the module control units 302A and 302B of the respective functional modules 300A and 300B, the bus functions of the respective modules control units 302A and 302B are normally operated. Thus, since the CPU module 200 and the respective functional modules 300A and 300B start their normal operations and the data exchanges between the CPU module 200 and the respective functional modules 300A and 300B become possible, the operation which is normal for the programmable controller 1 can be started.

Figure 7:
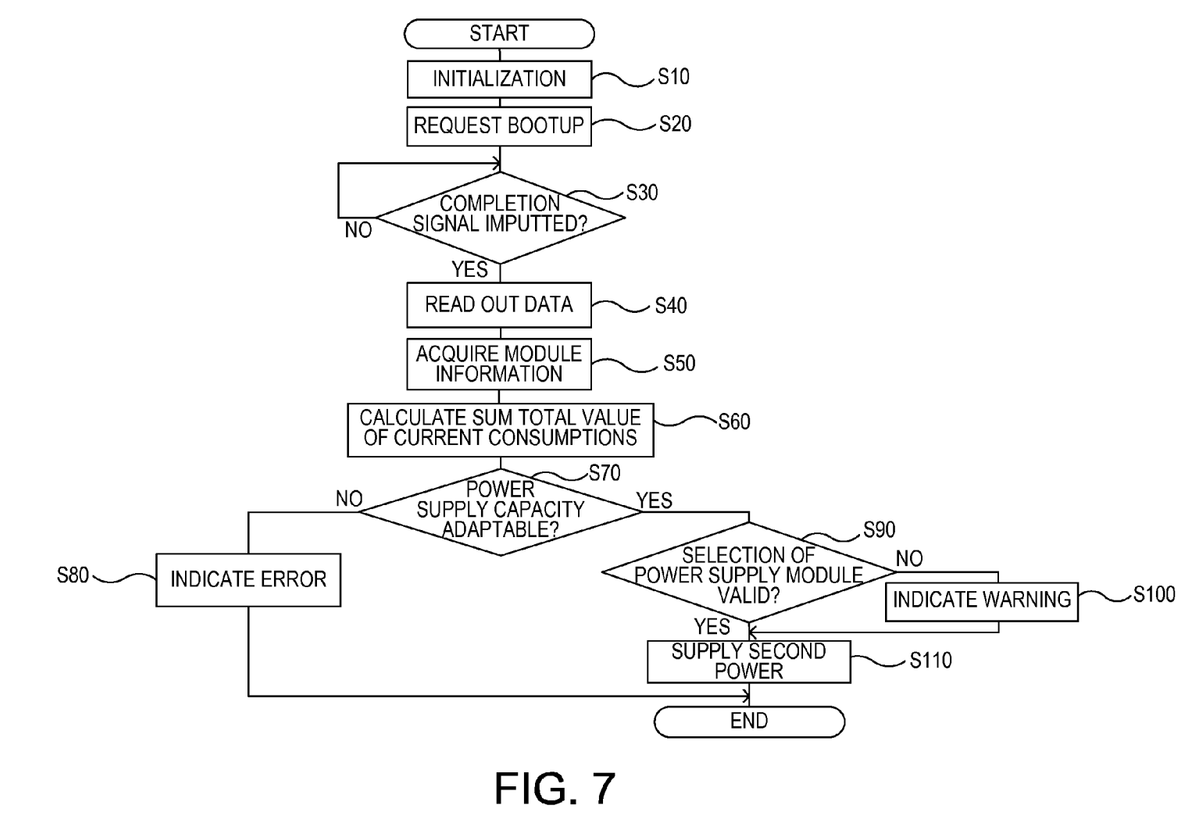
FIG. 7 is a flowchart representing the details of control processing executed by a microprocessor.

In order to achieve the function described above, the details of the control processing which is performed by the microprocessor 202 are sequentially described using FIG. 7.

In FIG. 7, the processing shown in this flowchart is started when the programmable controller 1 is powered up, and the first power from the converter 102 is supplied from the power supply module 100 to the microprocessor 202 via the first power system line L1. First, at Step S10, the microprocessor 202 executes predetermined initialization processing.

Then, at Step S20, the microprocessor 202 outputs the bootup request to the LD control block 2063 of the ID readout circuit block 206.

Then, proceeding to Step S30, the microprocessor 202 determines whether the completion signal is inputted from the CLK control block 2062 of the ID readout circuit block 206. The determination of Step S30 will not be satisfied until the completion signal is inputted and, the microprocessor 202 thus loops to stand by, and when the completion signal is inputted, the determination of Step S30 is satisfied and, the microprocessor 202 proceeds to Step S40.

At Step S40, the microprocessor 202 outputs the control signal to the address decoder 2069 of the ID readout circuit block 206, outputs the read signal to the read buffer 2068 of the ID readout circuit block 206, and reads the 8-bitwise parallel data (the unit ID or terminal code "00000000") set in the unit ID register 2067 of the ID readout circuit block 206 in 1 byte at a time sequentially from an upper address to sequentially acquire the read data. Thus, the unit IDs are acquired for all the power supply module 100, the CPU module 200, and the functional modules 300A and 300B.

Then, at Step S50, the microprocessor 202 accesses the data table stored in the table data storage part 205, and acquires the corresponding module information, i.e., the module information on all the power supply module 100, the CPU module 200, and the functional modules 300A and 300B, based on the unit IDs acquired at Step S40 described above.

Then, proceeding to Step S60, the microprocessor 202 refers to the current consumption information in the module information of the CPU module 200 and the functional modules 300A and 300B other than the power supply module 100, which are acquired at Step S50 described above, integrates the current consumption of the CPU module 200 and the current consumptions of the respective functional modules 300A and 300B to calculate the sum total value of the current consumptions of the CPU module 200 and the functional modules 300A and 300B.

Then, at Step S70, the microprocessor 202 refers to the power-supply capacity information in the module information of the power supply module 100 acquired at Step S50 described above to acquire the power supply capacity of the power supply module 100. Then, by comparing the acquired power supply capacity of the power supply module 100 with the sum total value of the current consumptions of the CPU module 200 and the functional modules 300A and 300B calculated at Step S60 described above, it determines whether the power supply capacity of the power supply module 100 is equal to or greater than the sum total value of the current consumptions of the CPU module 200 and the functional modules 300A and 300B. This determines the adaptability of the power supply capacity of the power supply module 100. If the power supply capacity of the power supply module 100 is less than the sum total value of the current consumptions of the CPU module 200 and the functional modules 300A and 300B, it then determines that the power supply capacity of the power supply module 100 is not adaptable, and proceeds to Step S80.

At Step S80, the microprocessor 202 outputs an indication signal to the status display unit 207 to display an error indication which means that a replacement to a power supply module having a larger power supply capacity is urged to an operator. For example, if the status display unit 207 is comprised of LEDs, light may be emitted, or, if the status display unit 207 is comprised of a liquid crystal display, the indication may be displayed. Then, the processing shown in this flowchart is ended.

On the other hand, at Step S70 described above, if the power supply capacity of the power supply module 100 is equal to or greater than the sum total value of the current consumptions of the CPU module 200 and the functional modules 300A and 300B, it determines that the power supply capacity of the power supply module 100 is adaptable, and proceeds to Step S90.

At Step S90, the microprocessor 202 determines, for example, whether the power supply module 100 is replaceable to a power supply module having a smaller capacity in the corresponding product lineup stored in the memory (not illustrated). This determines the validity of the selection of the power supply module 100. If replaceable to the power supply module having a smaller capacity on the product lineup, it then determines that the selection of the power supply module 100 is not appropriate, and proceeds to Step S100.

At Step S100, the microprocessor 202 outputs a status signal to the status display unit 207 to display a warning indication which means that a replacement to a power supply module having a suitable capacity (for example, a power supply module having a minimum necessary power supply capacity) on the product lineup described above is urged to an operator. For example, if the power supply capacity of the power supply module 100 is 10 A, and the sum total value of the current consumptions of the CPU module 200 and the functional modules 300A and 300B is 4 A, and, as the power supply module having a smaller capacity on the product lineup, there are a power supply module having an 8 A power supply capacity and a power supply module having a 5 A power supply capacity, an indication which means a replacement to the power supply module of the 5 A power supply capacity which is closer to the 4 A sum total value of the current consumptions described above is urged as the warning indication. Alternatively, for example, in the case where the status display unit 207 is comprised of LEDs, if the replacement to the power supply module of a one-grade smaller capacity is urged, the light is blinked at a low frequency, and if the replacement to the power supply module of a more-than-one-grade smaller capacity is urged, the light may be blinked at a high frequency, or, if the status display unit 207 is comprised of the liquid crystal display, the contents described above may be displayed. Then, it proceeds to Step S110.

On the other hand, at Step S90 described above, if the replacement to the power supply module having the smaller capacity on the product lineup is not possible, it determines that the selection of the power supply module 100 is appropriate, and proceeds to Step S110.

At Step S110, the microprocessor 202 controls the power supply module 100 to supply the second power from the converter 102, from the power supply module 100 to other CPU module 200 and functional modules 300A and 300B. That is, the control signal is outputted to the relay 103 of the power supply module 100 to close the contact of the relay 103, and the second power is supplied, via the second power system line L2, to the bus controlling unit 203 of the CPU module 200, and the module control units 302A and 302B of the respective functional modules 300A and 300B. Thus, the CPU module 200 and the respective functional modules 300A and 300B start their normal operations and the data exchanges between the CPU module 200 and the respective functional modules 300A and 300B become possible and, therefore, the normal operation as the programmable controller 1 is started. Then, the processing shown in this flowchart is ended. Note that processing shown in this flow is executed by the microprocessor 202, each time the programmable controller 1 is powered up and the first power from the converter 102 is supplied from the power supply module 100 to the microprocessor 202 via the first power system line L1.

As described above, in the programmable controller 1 of this embodiment, the power supply module 100 supplies the first power via the first power system line L1, and supplies the second power via the second power system line L2. Thus, it is possible that, when the programmable controller 1 is powered up and the commercial power is supplied to the power supply module 100, the first power is first supplied from the power supply module 100 to other modules 200, 300A and 300B to determine the adaptability of the power supply capacity by the microprocessor 202 of the CPU module 200, the second power is then supplied, for example, to perform the data exchanges between the CPU module 200 and other functional modules 300A and 300B, and operate the microprocessors of the respective functional modules 300A and 300B.

At this time, the first power is sufficient to be supplied only to peripheral circuits of the microprocessor 202 of the CPU module 200, and to circuits for sending out the unit IDs of the power supply module 100, the CPU module 200, and the functional modules 300A and 300B. The current consumptions of these circuits are significantly smaller compared with the current consumption at the time of the normal operation of the power supply module 100, the CPU module 200, and the functional modules 300A and 300B. As a result, even when the power supply capacity of the power supply module 100 is less than the sum total value of the current consumptions at the time of the normal operation of the CPU module 200 and the functional modules 300A and 300B other than the power supply module 100, the microprocessor 202 of the CPU module 200 can be operated normally to accurately determine that the power supply capacity is not adaptable (the capacity is insufficient). Therefore, the adaptability of the power supply capacity can accurately be determined regardless of the size of the power supply capacity of the equipped power supply module 100.

Further, particularly in this embodiment, the power supply module 100 supplies only the first power when the programmable controller 1 is powered up. Thus, the current consumption at the time of the adaptability determination of the power supply capacity of the power supply module 100 is reduced, and even when the power supply capacity of the power supply module 100 is small, the adaptability can accurately be determined. Further, in this embodiment, only when the microprocessor 202 of the CPU module 200 determines that the power supply capacity of the power supply module 100 is adaptable, the power supply module 100 is controlled to supply the second power. Thus, it can prevent the operation of the power supply module 100, the CPU module 200, and the functional modules 300A and 300B from being unstable due to lack of the power supply voltage from the power supply module 100, and the programmable controller 1 can be operated normally.

Further, particularly in this embodiment, the power supply module 100 includes the converter 102 which generates the first power and the second power from the primary side power supply 400, and the relay 103 which switches between isolation and supply of the second power from the converter 102 by opening and closing the contact. When the microprocessor 202 of the CPU module 200 determines that the power supply capacity of the power supply module 100 is adaptable, it closes the contact of the relay 103 to supply the second power. By closing the contact of the relay 103 of the power supply module 100 when the microprocessor 202 of the CPU module 200 determines that the power supply capacity of the power supply module 100 is adaptable, the power supply module 100 can securely be controlled to supply the second power.

Further, particularly in this embodiment, in the determination of the adaptability of the power supply capacity of the power supply module 100, the unit ID parts 104, 204, 303A, and 303B of the power supply module 100, the CPU module 200, and the functional modules 300A and 300B output the ID signal corresponding to the unit ID. Then, the microprocessor 202 of the CPU module 200 acquires those unit IDs, refers to the data table stored in the data table memory unit 205 based on the unit IDs, and calculates the sum total value of the current consumptions of the CPU module 200 and the functional modules 300A and 300B other than the power supply module 100 to determine the adaptability of the power supply capacity of the power supply module 100. By having such a configuration, in the determination of the adaptability of the power supply capacity of the power supply module 100, since the power supply module 100, the CPU module 200, and the functional modules 300A and 300B are not necessary to output the module information itself but need only to output the ID signals corresponding to the unit IDs having a small amount of data, the amount of data transfer can be reduced and the current consumption at the time of the adaptability determination of the power supply capacity of the power supply module 100 can be further reduced. Further, since the amount of data transfer is small, the adaptability of the power supply capacity of the power supply module 100 can be determined promptly.

Further, particularly in this embodiment, the CPU module 200 includes the ID readout circuit block 206 which outputs the CLK signal to the unit ID parts 104, 204, 303A, and 303B of the power supply module 100, the CPU module 200, and the functional modules 300A and 300B, and inputs the ID signals outputted according to the CLK signal from the power supply module 100, the CPU module 200, and the functional modules 300A and 300B to store the corresponding unit IDs. Thus, since it becomes unnecessary for the microprocessor 202 itself of the CPU module 200 to read the unit IDs from the power supply module 100, the CPU module 200, and the functional modules 300A and 300B, the programmable controller 1 can be constructed by using the CPU module 200 which has the microprocessor 202 with fewer input/output interfaces.

Further, in this embodiment, the following effects can be particularly acquired. That is, even if the power supply capacity of the power supply module 100 is equal to or greater than the sum total value of the current consumptions of the CPU module 200 and the functional modules 300A and 300B, when it greatly exceeds a required amount, an increase in cost required for the power supply module 100 will be caused. Thus, in this embodiment, when the microprocessor 202 of the CPU module 200 determines that the power supply capacity of the power supply module 100 is equal to or greater than the sum total value of the current consumptions of the CPU module 200 and the functional modules 300A and 300B other than the power supply module 100, and when the power supply capacity is adaptable, it further determines whether the power supply module 100 is replaceable to the power supply module having the smaller capacity in the corresponding product lineup. Thus, it is possible to warn the operator if replaceable, and to urge the replacement to the power supply module having a suitable capacity on the product lineup (for example, the power supply module having a minimum necessary power supply capacity). As a result, the cost required for the power supply module 100 can be suppressed.

Further, particularly in this embodiment, the CPU module 200 includes the status display unit 207 which performs the error indication when the microprocessor 202 determines that the power supply capacity of the power supply module 100 is not adaptable, and which performs the warning indication when the microprocessor 202 determines that the power supply module 100 is replaceable to the power supply module having the smaller capacity on the corresponding product lineup. Thus, when the power supply capacity of the power supply module 100 is not adaptable, the exchange to the power supply module having the larger power supply capacity can be urged to the operator, and, when the power supply module 100 is replaceable to the power supply module having the smaller capacity, the replacement to the power supply module having a minimum necessary power supply capacity can be urged to the operator. As a result, it can certainly be replaced to the suitable power supply module 100.

Note that the embodiment is not limited to the details described above, and it may be variously modified within the scope but without departing from the meaning and technical idea thereof. Hereinafter, such modifications are described in order.

(1) When the microprocessor itself reads the unit ID from the respective modules In the embodiment described above, although the ID readout circuit block 206 which is different from the microprocessor 202 reads the unit IDs from the power supply module 100, the CPU module 200, and the functional modules 300A and 300B, it is not limited to this and the microprocessor itself may read the unit IDs from the power supply module 100, the CPU module 200, and the functional modules 300A and 300B.

Figure 8:
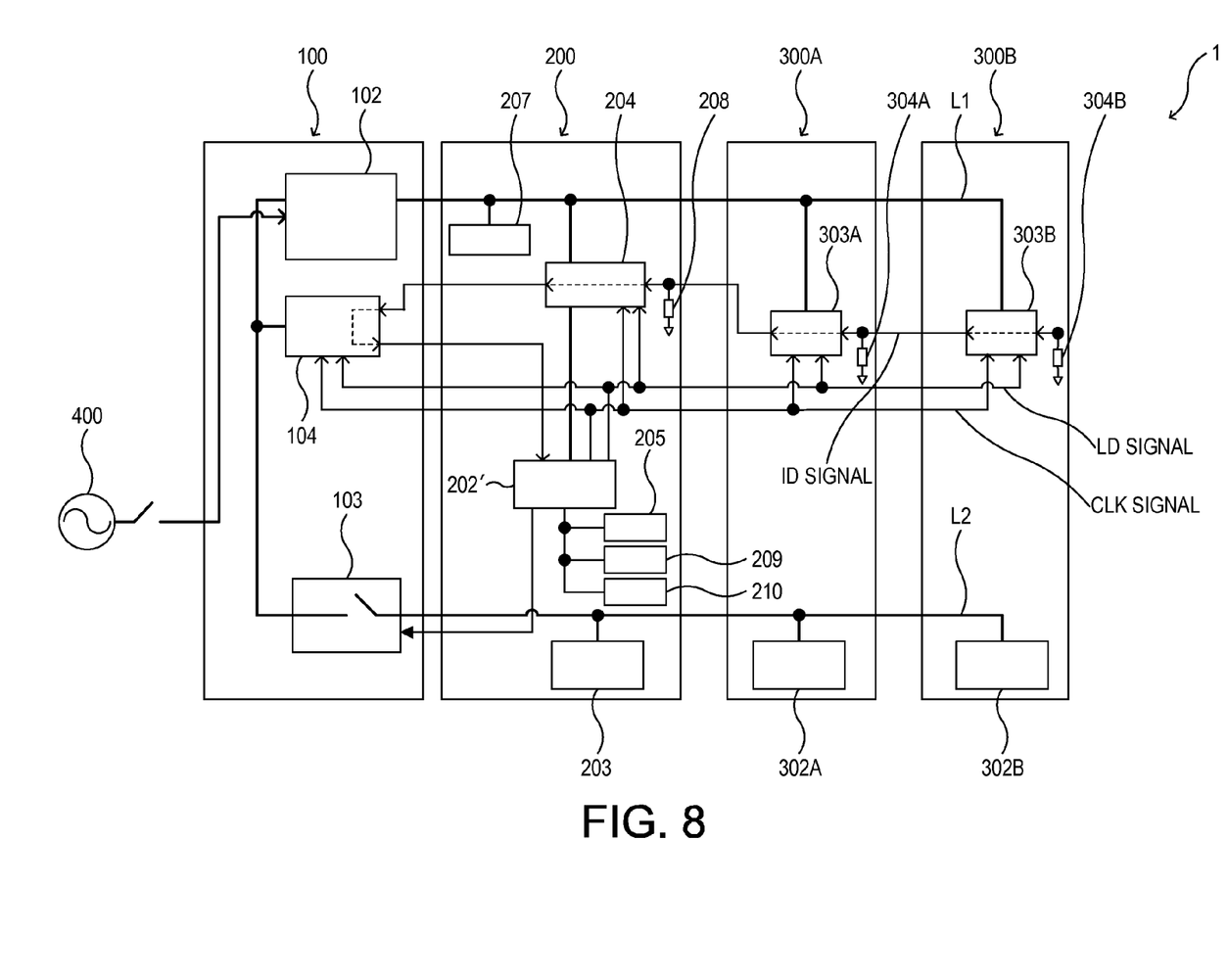
FIG. 8 is an illustrative view conceptionally representing configurations of respective modules which the programmable controller equips, signal routes between the respective modules, and energizing routes between the respective modules, in a modification in which the microprocessor itself reads the unit ID from the respective modules.

As shown in FIG. 8, the CPU module 200 in this modification includes a microprocessor 202' for entirely performing various controls (processor), the bus controlling unit 203 described above, the unit ID part 204 described above, the data table memory unit 205, a program memory unit 209 (second memory unit) connects with the microprocessor 202' and for storing a program for reading the unit IDs from the power supply module 100, the CPU module 200, and the functional modules 300A and 300B, a unit ID memory unit 210 (third memory unit), the status display unit 207 described above, and a pull-down resistor 208. Note that a memory provided inside the microprocessor 202' may be used as the second memory unit or the third memory unit.

In this modification, when the first power is supplied from the converter 102 as described above, the microprocessor 202' executes the predetermined initialization processing, then activate its own output port, and outputs the LD signal to the unit ID parts 104, 204, 303A, and 303B of the power supply module 100, the CPU module 200, and the functional modules 300A and 300B. Thus, the unit ID is set to the unit ID parts 104, 204, 303A, and 303B, respectively. Then, the microprocessor 202' sequentially outputs the CLK signals to the respective unit ID parts 104, 204, 303A, and 303B. Here, although the routes of the ID signal outputted from the respective unit ID parts 104, 204, 303A, and 303B are the same as those of the embodiment described above, the final destination of the ID signal is an input port of the microprocessor 202' unlike the embodiment described above. The ID signal inputted into the microprocessor 202' is converted into the 8-bitwise (1-bytewise) parallel data (the unit ID or terminal code "00000000"), and is set to the unit ID register (not illustrated). Note that the microprocessor 202' continuously outputs the CLK signal until it detects the terminal code "00000000," and, when the terminal code "00000000" is detected, it suspends the output of the CLK signal. Then, it sequentially reads the 8-bitwise parallel data set in the unit ID register in the order from an upper address in 1 byte at a time (or may be one word at a time), ends the read-out when the terminal code "00000000" is read, and stores the read unit ID in the unit ID memory unit 210. After that, it refers to the data table stored in the data table memory unit 205 based on the unit ID stored in the unit ID memory unit 210, and performs the determination and the like described above.

Figure 9:
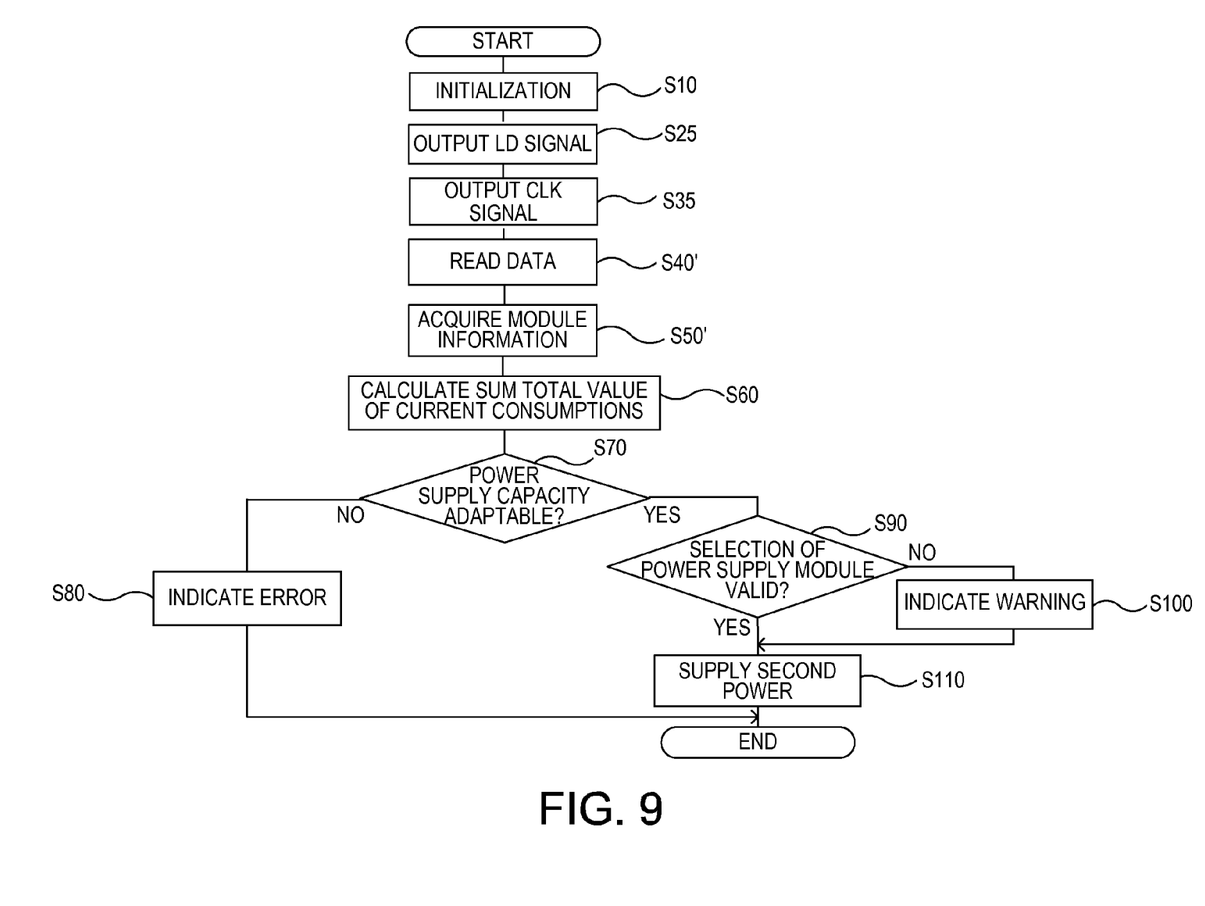
FIG. 9 is a flowchart representing the details of control processing executed by the microprocessor based on a program stored in a program memory unit.

In order to achieve the function described above, the details of the control processing executed by the microprocessor 202' based on the program stored in the program memory unit 209 is described using FIG. 9 in order.

In FIG. 9, the processing shown in this flowchart is started when the programmable controller 1 is powered up and the first power from the converter 102 is supplied from the power supply module 100 to the microprocessor 202' via the first power system line L1. Step S10 corresponds to that of FIG. 7 described above, and the microprocessor 202' executes initialization processing.

Then, at Step S25, the microprocessor 202' outputs the LD signal to the unit ID parts 104, 204, 303A, and 303B of the power supply module 100, the CPU module 200, and the functional modules 300A and 300B.

Then, proceeding to Step S35, the microprocessor 202' sequentially outputs the CLK signal to the respective unit ID parts 104, 204, 303A, and 303B. Thus, the ID signal is outputted from the unit ID parts 104, 204, 303A, and 303B, respectively. This procedure of Step S35 corresponds to the first procedure described in the claims.

Then, at Step S40', the microprocessor 202' is inputted with the ID signal outputted from the unit ID part 104 of the power supply module 100, converts it into the 1-bytewise parallel data (the unit ID or terminal code "00000000"), and stores it in the unit ID memory unit 210. This corresponds to inputting the unit IDs outputted from the respective unit ID parts 104, 204, 303A, and 303B and storing them in the unit ID memory unit 210. This acquires the unit IDs for all the power supply module 100, the CPU module 200, and the functional modules 300A and 300B. This procedure of Step S40' corresponds to the second procedure described in the claims.

Then, proceeding to Step S50', the microprocessor 202' accesses the data table stored in the table data storage part 205, and acquires the corresponding module information based on unit IDs stored in the unit ID memory unit 210 at Step S40' described above, i.e., the module information on all the power supply module 100, the CPU module 200, and the functional modules 300A and 300B.

Since subsequent Step S60 to Step S110 are similar to those of the FIG. 7 described above, description thereof will be omitted. Note that the procedures of Step S60 and Step S70 in this modification corresponds to the third procedure described in the claims.

According to this modification, similar effects as the embodiment described above can be acquired. In addition, according to this modification, by the microprocessor 202' itself of the CPU module 200 reading the unit IDs from the power supply module 100, the CPU module 200, and the functional modules 300A and 300B, it is unnecessary to provide an ID readout circuit block other than the microprocessor 202' and, thus, the number of components can be reduced.

(2) When the supply control of the second power is carried out with an enabling signal In the embodiment described above, although the primary side power supply 400 is connected with the converter 102, the converter 102 generates the power supply voltage, and the microprocessor 202 controls the opening and closing of the contact of the relay 103 to control the supply of the second power, it is not limited to this. That is, the primary side power supply 400 may be connected with two power supply devices, the power supply voltage may be generated in each, and the microprocessor 202 may output the control signal to one of the power supply devices to control the supply of the second power.

Figure 10:
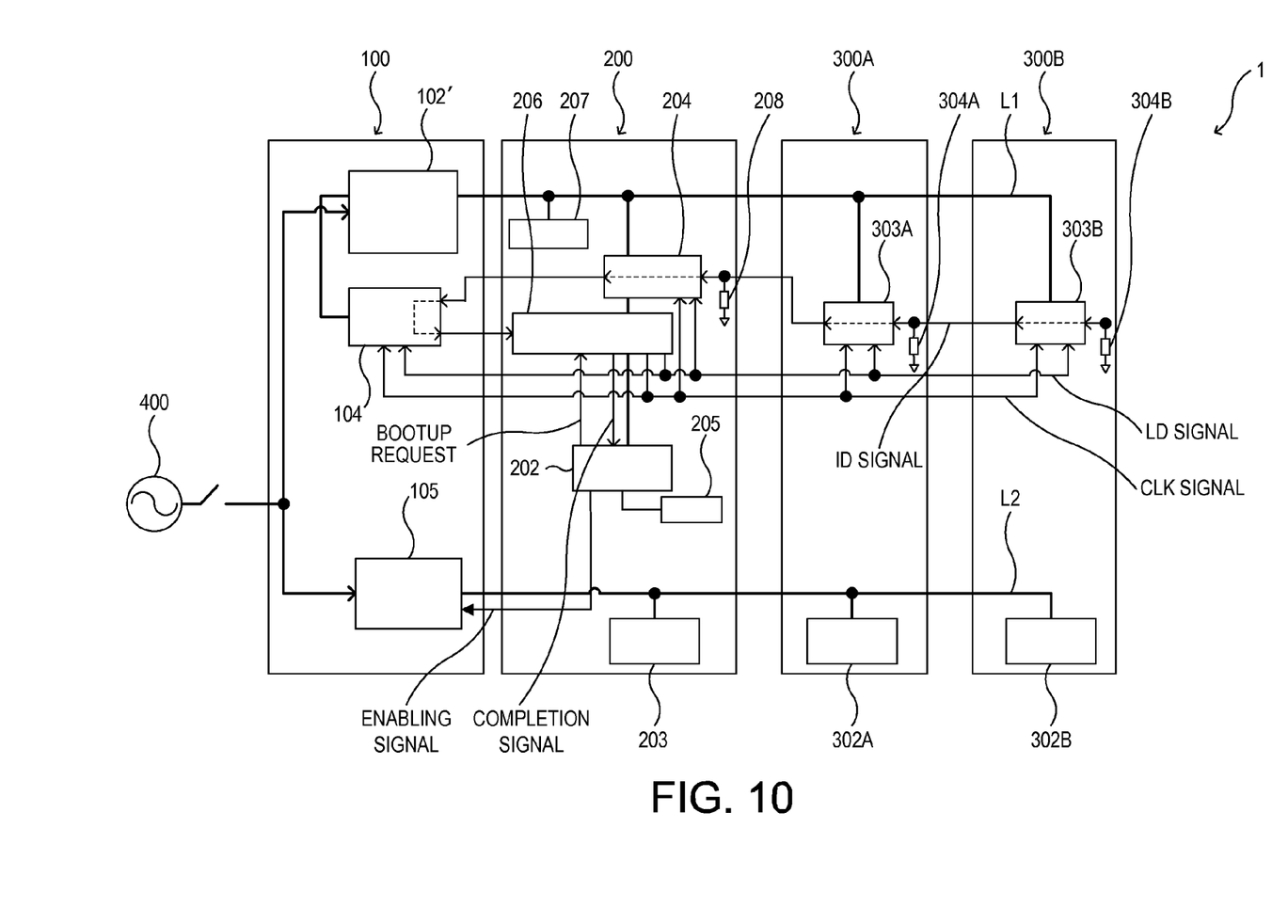
FIG. 10 is an illustrative view conceptionally representing configurations of respective modules which the programmable controller equips, signal routes between the respective modules, and energizing routes between the respective modules, in a modification in which a supply control of a second power supply is carried out with an enabling signal.

As shown in FIG. 10, the power supply module 100 in this modification includes a converter 102' (second power supply device) connected with the primary side power supply 400, the unit ID part 104 described above, and a converter 105 (third power supply device) connected with the primary side power supply 400 and having an enabling function.

The converter 102' generates the power supply voltage based on the commercial power supplied from the primary side power supply 400, and supplies the generated power supply voltage as the first power via the first power system line L1.

The converter 105 with the enabling function generates the power supply voltage based on the commercial power supplied from the primary side power supply 400, and controls the supply of the second power by using the generated power supply voltage as the second power.

Then, the microprocessor 202 of the CPU module 200 determines the adaptability of the power supply capacity of the power supply module 100 similar to the above, and when it determines that the power supply capacity of the power supply module 100 is adaptable, it outputs the enabling signal (control signal) to the converter 105 with the enabling function to supply the second power via the second power system line L2. That is, the second power is supplied to the bus controlling unit 203 of the CPU module 200, and the module control units 302A and 302B of the respective functional modules 300A and 300B, via the second power system line L2.

According to this modification, similar effects to the embodiment described above can be acquired. In addition, according to this modification, since, when the microprocessor 202 of the CPU module 200 determines that the power supply capacity of the power supply module 100 is adaptable, it outputs the enabling signal to the converter 105 with the enabling function, and can securely control so that the power supply module 100 supplies the second power.

(3) When the agreement or disagreement of the module configuration before a power-off and after a power-on is determined That is, the microprocessor 202 of the CPU module 200 may compare the unit IDs acquired before the power-off of the programmable controller 1 with the unit IDs acquired after the power-on to determine whether the configurations (types and order) of the plurality of modules with which the programmable controller 1 equips are in agreement before the power-off and after the power-on of the programmable controller 1. Thus, when the microprocessor 202 of the CPU module 200 determines that the configurations of the plurality of modules are not in agreement before the power-off and after the power-on of the programmable controller 1, it concludes that maintenance, a failure of the programmable controller 1, or the like occurs and, therefore, it is possible to warn the operator.

(4) When the suitability of a spatial relationship of the modules is determined

That is, the microprocessor 202 of the CPU module 200 may refer, based on the order of the unit IDs of the power supply module 100, the CPU module 200, and the functional modules 300A and 300B acquired as described above, refers to the data table stored in the data table memory unit 205 described above to determine the suitability of the spatial relationships of the power supply module 100, the CPU module 200, and the functional modules 300A and 300B, with which the programmable controller 1 equips. Thus, when there is a spatial relationship which is not preferred such that, for example, a relay output module which generates noise is arranged next to a functional module having a high-speed processor or a high-speed synchronous memory, or an input module and an output module which generates a large amount of heat are sequentially arranged, the microprocessor 202 of the CPU module 200 may determine it and warn the operator.

(5) When the existence of a module which the CPU module does not support is determined That is, the microprocessor 202 of the CPU module 200 may refer, based on the unit IDs of the power supply module 100, the CPU module 200, and the functional modules 300A and 300B acquired as described above, the data table stored in the data table memory unit 205 described above to determine whether a module which the functions of the CPU module 200 do not support is included in the power supply module 100 and the functional modules 300A and 300B with which the programmable controller 1 equips. Thus, when a module which the functions of the CPU module 200 do not support is equipped, the microprocessor 202 can determine it and warn the operator.

(6) When the status display unit is provided outside the device

In the embodiment described above, although the CPU module 200 is configured to have the status display unit 207, it may be configured without the status display unit 207. In this case, it may be configures so that the CPU module 200 outputs the indication signal to an external display instrument (a PC, etc.) via wired or wireless communications to display it on the display instrument.

Alternatively, other than those already described above, approaches by the embodiment described above and the respective modifications may be suitably combined and utilized.

In addition, although illustration is not made for all, various changes is made to the embodiment described above and the respective modifications to implement the embodiment described above and the respective modifications within the scope thereof without departing from the meaning thereof.

What is claimed is:

1. A control device of a building block type comprising a plurality of modules at least including a power supply module and a CPU module, the CPU module including:
    a processor having a determination control function for determining the adaptability of a power supply capacity of the power supply module by comparing the power supply capacity of the power supply module with a sum total value of current consumptions of the respective modules other than the power supply module,
    wherein the power supply module supplies a first power used for the determination of the adaptability of the power supply capacity including power supplied to the processor and a second power used for others as at least two independent power supply systems,
    wherein the power supply module supplies the first power when the control device is powered up, and
    wherein the processor determines that the power supply capacity of the power supply module is adaptable when the power supply capacity of the power supply module is equal to or greater than the sum total value of the current consumptions, and controls the power supply module to supply the second power.

2. The control device of claim 1, wherein the power supply module supplies only the first power when the control device is powered up.

3. The control device of claim 1, wherein the plurality of modules includes an identification information outputting unit supplied with the first power to output identification information of the respective module,
    wherein the CPU module includes a first memory unit for storing a data table comprised of the identification information and corresponding module information, and
    wherein the processor acquires the identification information on all the plurality of modules, refers to the data table based on the identification information, and calculates the sum total value of the current consumptions to determine the adaptability of the power supply capacity of the power supply module.

4. The control device of claim 3, wherein the CPU module includes an identification information readout unit for outputting an output command of the identification information to the identification information outputting unit of the module, respectively, and for storing the identification information outputted from the identification information outputting units of the respective modules according to the output command, and
    wherein the processor acquires the identification information from the identification information readout unit.

5. The control device of claim 3, wherein the CPU module includes a second memory unit connected with the processor, and
    wherein the processor executes, based on a program stored in the second memory unit:
        a first procedure in which an output command of the identification information is outputted to the identification information outputting unit of the module, respectively;
        a second procedure in which the identification information outputted from the identification information outputting unit of the respective modules is stored in a third memory unit; and
        a third procedure in which the sum total value of the current consumptions is calculated with reference to the data table based on the identification information stored in the third memory unit to determine the adaptability of the power supply capacity of the power supply module.

6. The control device of claim 3, wherein the processor determines the suitability of spatial relationships of the plurality of modules by referring to the data table based on the acquired order of the identification information.

7. The control device of claim 3, wherein the processor determines whether configurations of the plurality of modules are in agreement before a power-off and after a power-on of the control device by comparing the identification information before the power-off and after the power-on of the control device.

8. The control device of claim 3, further including at least one functional module,
wherein the processor determines whether the plurality of modules includes a module not supported by the function of the CPU module by referring to the data table based on the acquired identification information.

9. The control device of claim 1, wherein each of the plurality of modules includes an identification information outputting unit configured to output identification information when supplied with the first power, the identification information outputting unit of the power supply module being configured to output unit identification information that identifies the power supply capacity of the power supply module.

10. A control device of a building block type comprising a plurality of modules at least including a power supply module and a CPU module, the CPU module including:
a processor having a determination control function for determining the adaptability of a power supply capacity of the power supply module by comparing the power supply capacity of the power supply module with a sum total value of current consumptions of the respective modules other than the power supply module,
wherein the power supply module supplies a first power used for the determination of the adaptability of the power supply capacity including power supplied to the processor and a second power used for others as at least two independent power supply systems,
wherein the power supply module supplies only the first power when the control device is powered up,
wherein the processor determines that the power supply capacity of the power supply module is adaptable when the power supply capacity of the power supply module is equal to or greater than the sum total value of the current consumptions, and controls the power supply module to supply the second power,
wherein the power supply module includes:
a first power supply device for generating the first power and the second power from a primary side power supply, and
a relay for switching between isolation and supply of the second power from the first power supply device by opening and closing a contact, and
wherein the processor closes the relay to supply the second power when the processor determines that the power supply capacity of the power supply module is adaptable.

11. A control device of a building block type comprising a plurality of modules at least including a power supply module and a CPU module, the CPU module including:
a processor having a determination control function for determining the adaptability of a power supply capacity of the power supply module by comparing the power supply capacity of the power supply module with a sum total value of current consumptions of the respective modules other than the power supply module,
wherein the power supply module supplies a first power used for the determination of the adaptability of the power supply capacity including power supplied to the processor and a second power used for others as at least two independent power supply systems,
wherein the power supply module supplies only the first power when the control device is powered up,
wherein the processor determines that the power supply capacity of the power supply module is adaptable when the power supply capacity of the power supply module is equal to or greater than the sum total value of the current consumptions, and controls the power supply module to supply the second power,
wherein the power supply module includes:
a second power supply device for generating the first power from the primary side power supply, and
a third power supply device for generating the second power from the primary side power supply, and for being controllable of the supply of the second power, and
wherein the processor outputs a control signal to the third power supply device to supply the second power when the processor determines that the power supply capacity of the power supply module is adaptable.

12. A control device of a building block type comprising a plurality of modules at least including a power supply module and a CPU module, the CPU module including:
a processor having a determination control function for determining the adaptability of a power supply capacity of the power supply module by comparing the power supply capacity of the power supply module with a sum total value of current consumptions of the respective modules other than the power supply module,
wherein the power supply module supplies a first power used for the determination of the adaptability of the power supply capacity including power supplied to the processor and a second power used for others as at least two independent power supply systems, and
wherein the processor further determines whether the power supply module is replaceable to a module having a smaller capacity on a corresponding product lineup when the processor determines that the power supply capacity of the power supply module is adaptable.

13. The control device of claim 12, wherein the CPU module includes a display unit for performing an error indication when the processor determines that the power supply capacity of the power supply module is not adaptable, and performing a warning indication when the processor determines that the power supply module is replaceable to the module having the smaller capacity on the corresponding product lineup.

14. The control device of claim 13, wherein the display unit performs an indication for urging a replacement to a module having a suitable capacity on the product lineup as the warning indication.

* * * * *